(12) United States Patent
Lin

(10) Patent No.: US 6,213,336 B1
(45) Date of Patent: Apr. 10, 2001

(54) TEMPERATURE-STORING CUP/POT STRUCTURE

(76) Inventor: Shiow Maan Lin, 47, Lane 654, Jong Shin Rd. Sec 2, Dali, Taichung Hsien (TW)

(*) Notice: Subject to any disclaimer, the term of this patent is extended or adjusted under 35 U.S.C. 154(b) by 0 days.

(21) Appl. No.: 09/662,070

(22) Filed: Sep. 14, 2000

(51) Int. Cl.[7] .................................................... A47J 27/00
(52) U.S. Cl. ................................ 220/592.17; 220/592.16; 220/592.28
(58) Field of Search ........................ 220/592.17, 592.28, 220/592.01, 592.16, 574.2

(56) References Cited

U.S. PATENT DOCUMENTS

| | | | |
|---|---|---|---|
| 2,191,434 | * 2/1940 | Alder | 220/592.16 X |
| 2,526,165 | * 10/1950 | Smith | 220/592.17 |
| 4,383,422 | * 5/1983 | Gordon et al. | 220/592.16 X |
| 5,119,800 | * 6/1992 | Roberts et al. | 220/592.28 X |
| 5,125,391 | * 6/1992 | Srivastava et al. | 220/592.01 X |
| 5,611,328 | * 3/1997 | McDermott | 220/592.01 X |

* cited by examiner

*Primary Examiner*—S M Pollard
(74) *Attorney, Agent, or Firm*—Pro-Techtor International Services

(57) ABSTRACT

The temperature-storing cup/pot structure mainly comprises a cup/pot and a seat. The bottom face of the cup/pot is disposed with a temperature-storing conducting element. A temperature-storing acting body of the seat is fixed by an insulating member and is pushed by a resilient member. The temperature-storing acting body should be preheated to a desired temperature and then is moved on the seat. The resilient member will make the temperature-storing acting body close contact with the temperature-storing conducting element of the cup/pot to keep the cup/pot hot or cold for a period of time. It does not need the plug. It has no electrical wire connection problem. And, it can be used for a hot or cold drink.

11 Claims, 8 Drawing Sheets

TEMPERATURE-STORING CUP/POT STRUCTURE

BACKGROUND OF INVENTION

1. Field of the Invention

The present invention is related to a temperature-storing cup/pot structure. It does not need the plug. It has no electrical wire connection problem. And, it can be used for a hot or cold drink.

2. Description of the Prior Art

As shown in FIGS. 7 and 8, it is a conventional detachable insulating cup. It mainly comprises a ceramic cup 91 and a ceramic seat 92. They are detachable. When they are assembled, the electrical circuit is close (ON) to activate the heating process. Once the ceramic cup 91 is taken out, the electrical circuit is open (OFF). An electrical heater 93 is disposed on the bottom of the cup 91. The electrical heater 93 includes an outer electrical ring 931, an insulating seat 932, a large outer electrical plate 933, an inner electrical ring 934, a small inner electrical ring 935 and an ceramic electrical resistance 936. The outer electrical ring 931 and large outer electrical plate 933 form the first electrical route. The inner electrical ring 934 and the small inner electrical ring 935 form the second route. These two routes are connected with the ceramic electrical resistance 936 so that it will produce heat. And, the ceramic insulating seat 932 is used for separated these two routes and avoid the electrical short circuit.

Although the detachable insulating cup can keep the drink hot, it must have certain electrical wire connection to provide power. There must be some socket for plug, and the wire connection cannot be too long. In addition, it only can be used for hot drinks. It is impossible to used for a cold drink.

SUMMARY OF THE INVENTION

The first object of the present invention is to provide a temperature-storing cup/pot structure. It does not need any electrical power. It has no electrical wire connection problem. And, the present invention can be used or moved anywhere.

The second object of the present invention is to provide a temperature-storing cup/pot structure. It is suitable not only for a hot drink, but also for a cold drink.

Another object of the present invention is to provide a temperature-storing cup/pot structure. Once the cup/pot is moved out, the temperature-storing conducting element can keep the cup/pot hot or cold for a period of time.

DETAILED DESCRIPTION OF THE PREFERRED EMBODIMENT

The present invention is related to a temperature-storing cup/pot structure. It does not need the plug. It has no electrical wire connection problem. And, it can be used for a hot or cold drink.

Figure 1:
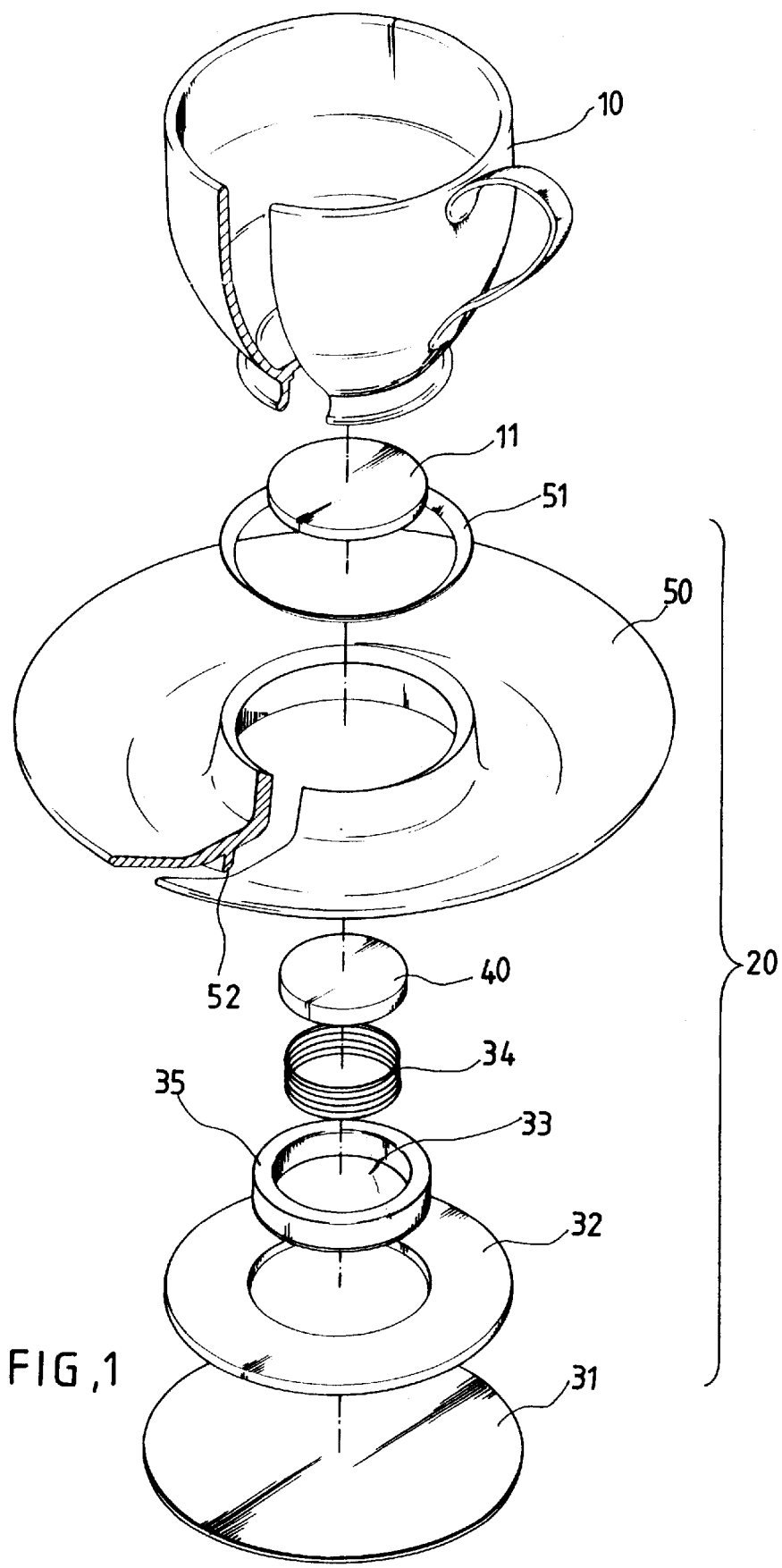
FIG. 1 is a perspective exploded view of the present invention.
Figure 2:
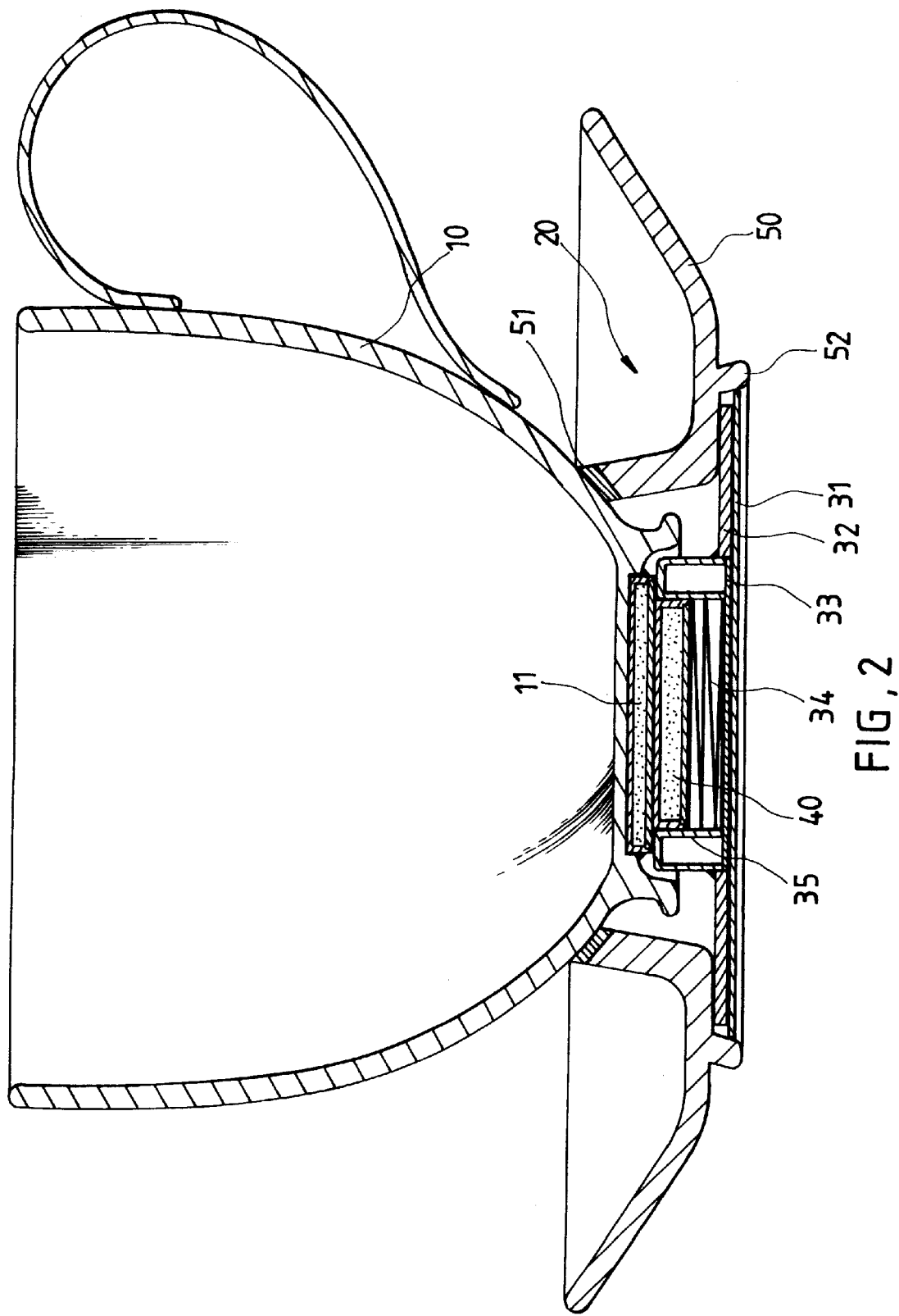
FIG. 2 is a cross-sectional assembled view of the present invention.
Figure 3:
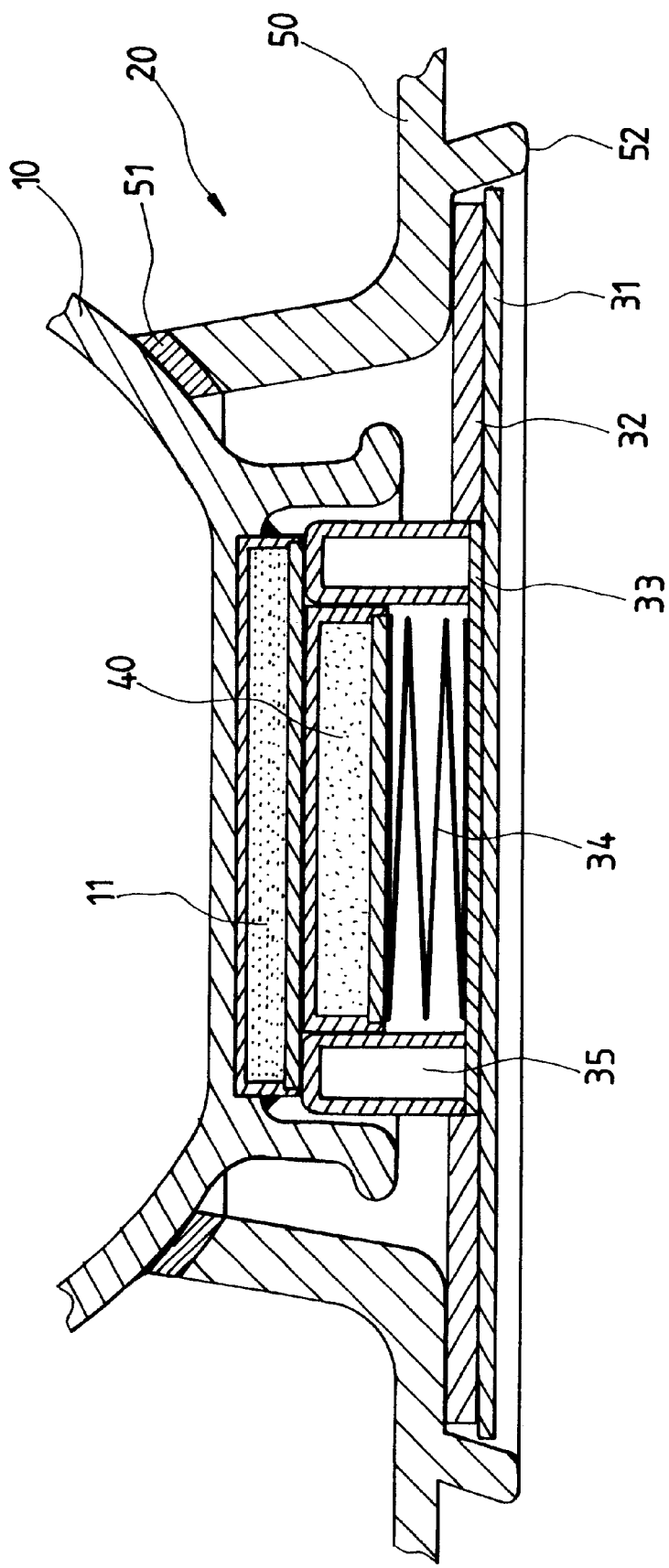
FIG. 3 is an enlarged view of a portion of the present invention.
Figure 4:
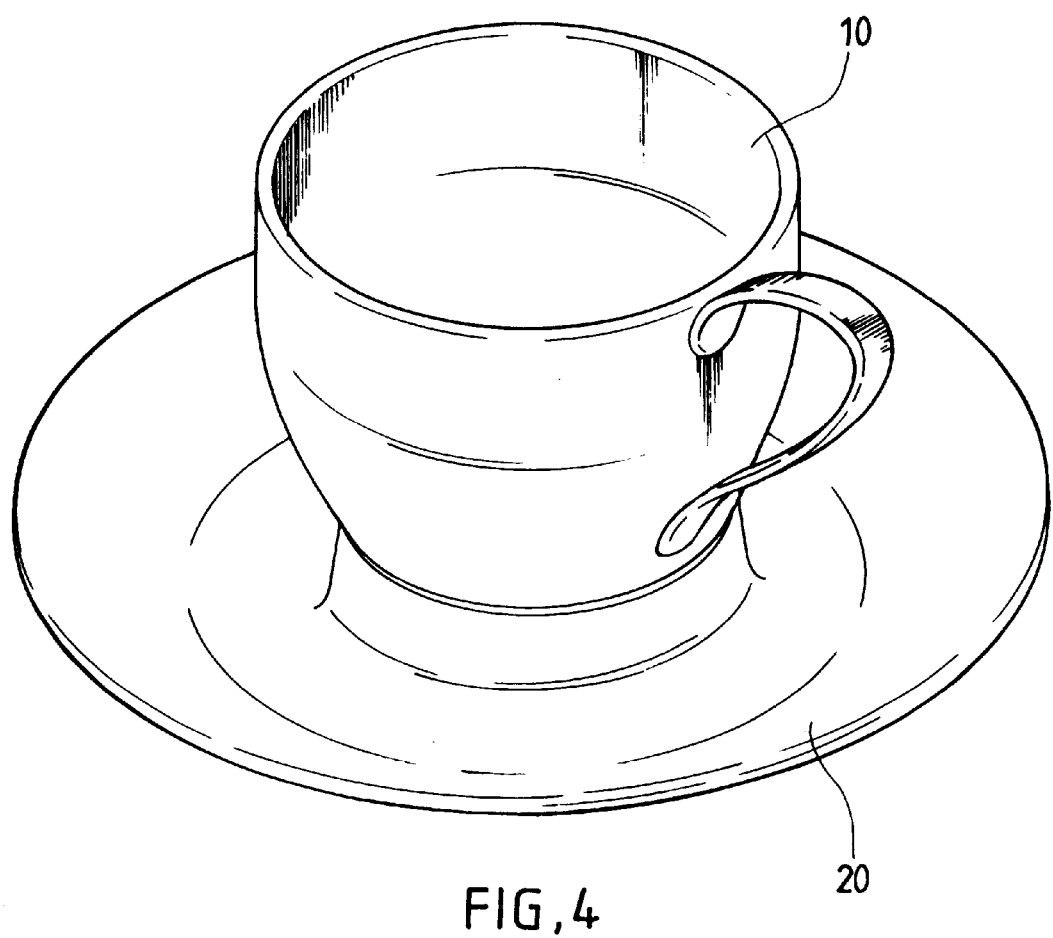
FIG. 4 is a perspective view of the present invention.
Figure 5:
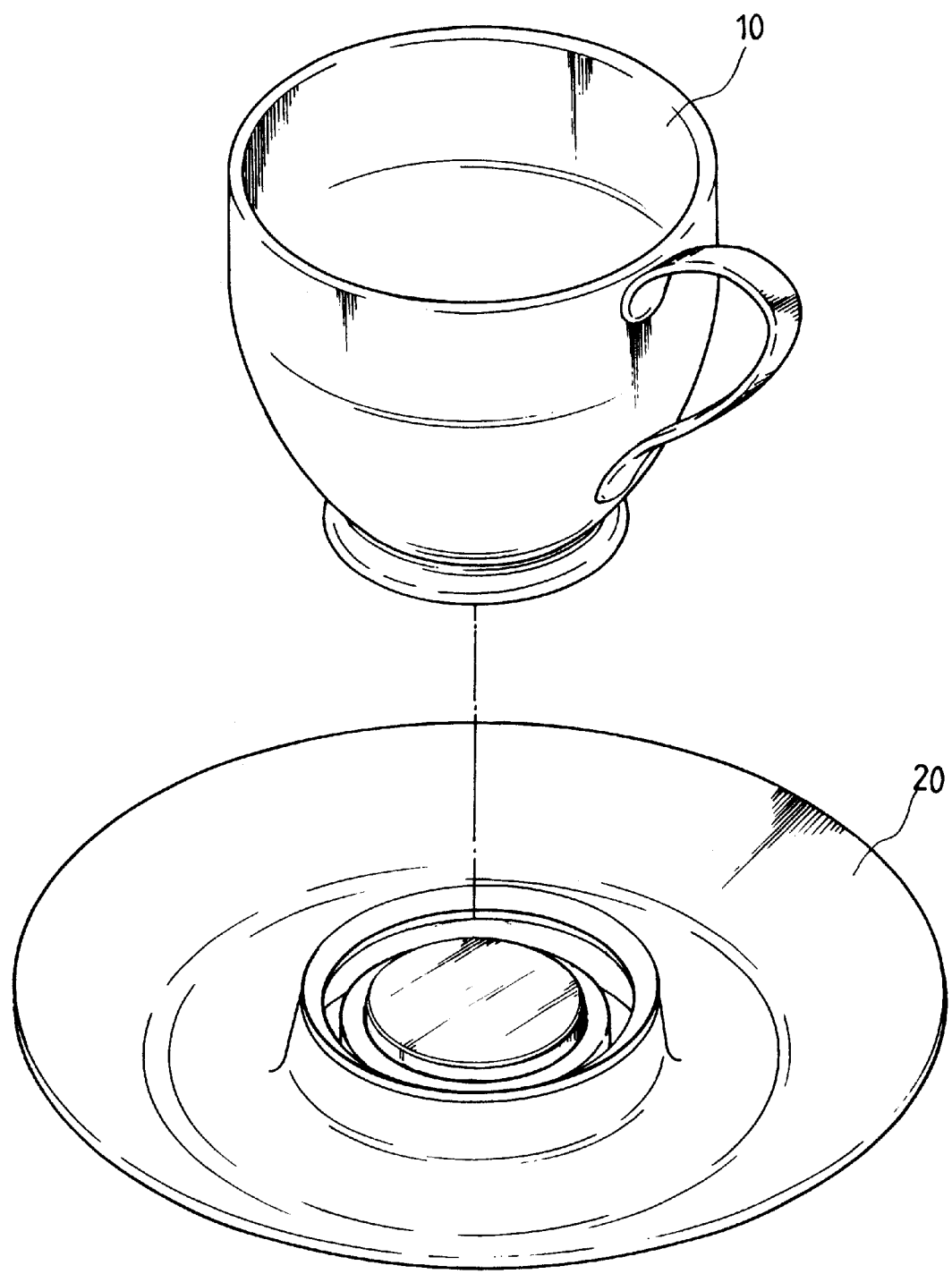
FIG. 5 is a separated cup and seat of the present invention.

Referring to FIG. 4 and 5, a temperature-storing cup/pot structure mainly comprises a cup 10 and a seat 20. Normally, the user can take the cup 10 out of the seat 20 for drinking (as shown in FIG. 5). After drinking it, the user will put the cup 10 back to the seat 20 (shown in FIG. 4).

Referring to Fogs. 1 to 3, they are a perspective exploded view, a cross-sectional assembled view and an enlarged view of a portion of the present invention.

In which, the seat 20 includes an insulating pad 31, a ring portion 32, a base portion 33, a resilient member 34, an insulating member 35, a temperature-storing acting body 40, a disk portion 50 and a plastic pad 51. The temperature-storing acting body 40 can be made by metal with a suitable wall thickness. The temperature-storing acting body 40 contains certain volume of the temperature-storing liquid. The ring portion 32 is disposed on the insulating pad 31. The base portion 33 is formed in a central hole of the ring portion 32. The ring-shaped insulating member 35 is disposed on a predetermined height of the base portion 33. The resilient element 34 is disposed inside the insulating member 35 and the base portion 33 for pushing the temperature-storing acting body 40. And, the insulating member 35 is used for preventing the temperature-storing acting body 40 sliding out. The inner space of the insulating member 33 can be vacuumed or be filled with formed material. After assembling the above-mentioned elements, they are fixed on the disk portion 50 and extended up from the central hole of the disk portion 50. Based on a protruded flange 52, both the insulating pad 31 and ring portion 32 are fixed in the bottom of the disk portion 50. A plastic pad 51 around the central hole of the disk portion 50 is disposed between the seat 20 and the cup 10 so as to reduce the heat transfer between them.

The cup 10 can be made of metal and coated with enamel. A temperature-storing conducting element 11 is disposed on a bottom face of the cup 10. The temperature-storing conducting element 11 is made by a metal with a suitable wall thickness and contains a temperature-storing liquid.

Based on the above-mentioned assembled elements, the insulating pad 31, the ring portion 32, the base portion 33, the resilient member 34, the insulating member 35, the disk portion 50 and the plastic pad 51 are fixed as an integral unit. Depending on the user's need (keep hot or keep cold), the temperature-storing acting body 40 can be placed in a refrigerator or in a hot baking oven. Therefore, the temperature-storing acting body 40 will absorb the heat or coldness. For example, if the user wants to drink a cup of hot coffee, the user can take out a pre-heated 150° C. to 200° C. temperature-storing acting body 40 and put it on the resilient member 34 inside the insulating member 35 of the seat 20. After which, the user puts the cup 10 on the seat 20. At this moment, the resilient element 34 pushes the temperature-storing acting body 40 closely contacting with the temperature-storing conducting element 11 of the cup 10. The temperature of the temperature-storing conducting element 11 is approximately 120° C. to 150° C. By means of the temperature-storing conducting element 11, the coffee inside the cup 10 can remain 80° C. to 60° C. about 20 to 30 minutes. If the user wants to re-fill a cup of hot coffee, the user can replace a new pre-heated temperature-storing acting body 40 so that the hot coffee can be remained at a desired temperature. No plug is needed. No electrical wire connection problem will be bothered. And, it is suitable for a cold drink or hot drink. In addition, when the user takes the cup 10 out (leaving the seat 20), the temperature-storing conducting element 11 still can keep the coffee hot for a while (lasting for a period of time). Thus, the coffee will not be cooled down soon and the taste of hot coffee is kept.

When the cup 10 is put on the seat 20, the insulation pad 51 will closely contact with the cup 10 for sealing and reducing heat loss.

Figure 6:
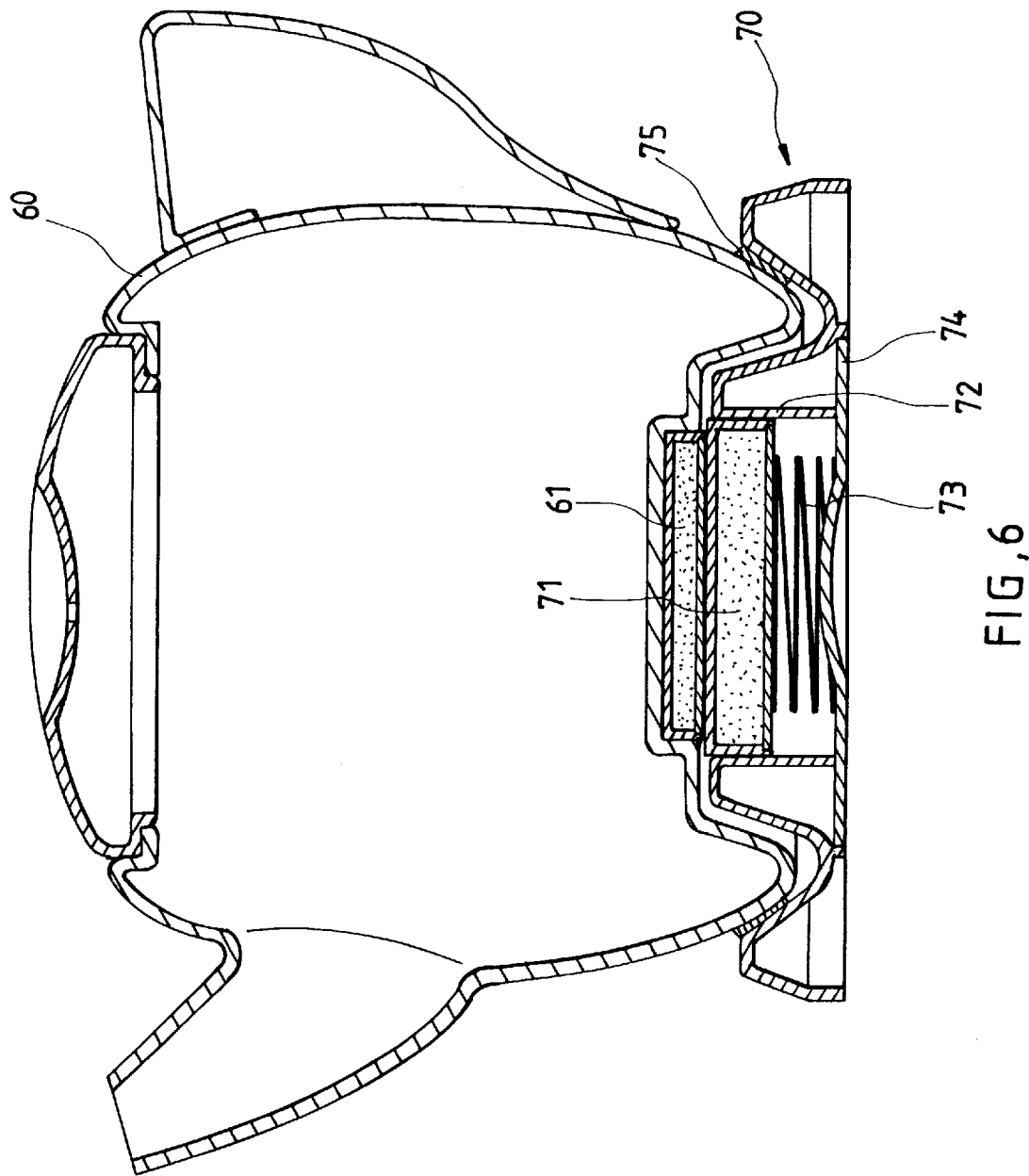
FIG. 6 is a cross-sectional view of another embodiment of the present invention.
Figure 7:
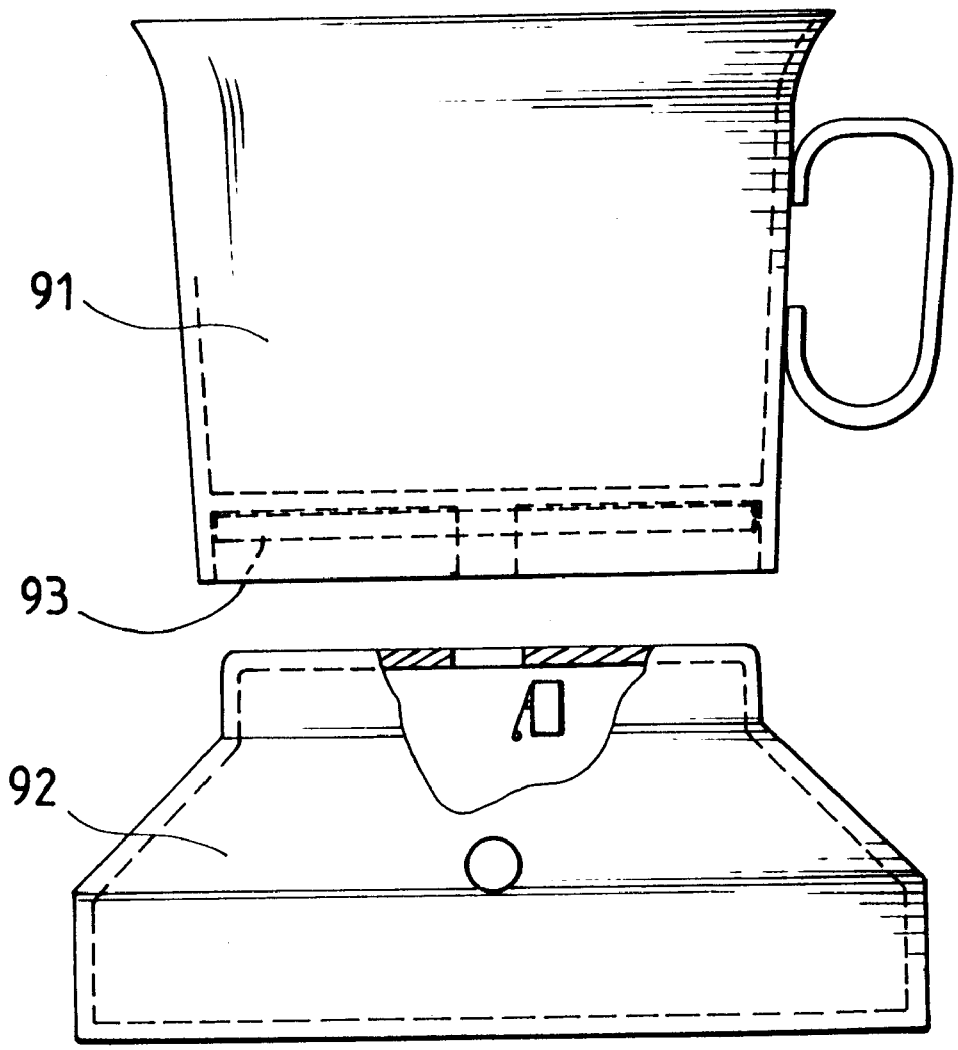
FIG. 7 is a front view of the conventional electrical cup.
Figure 8:
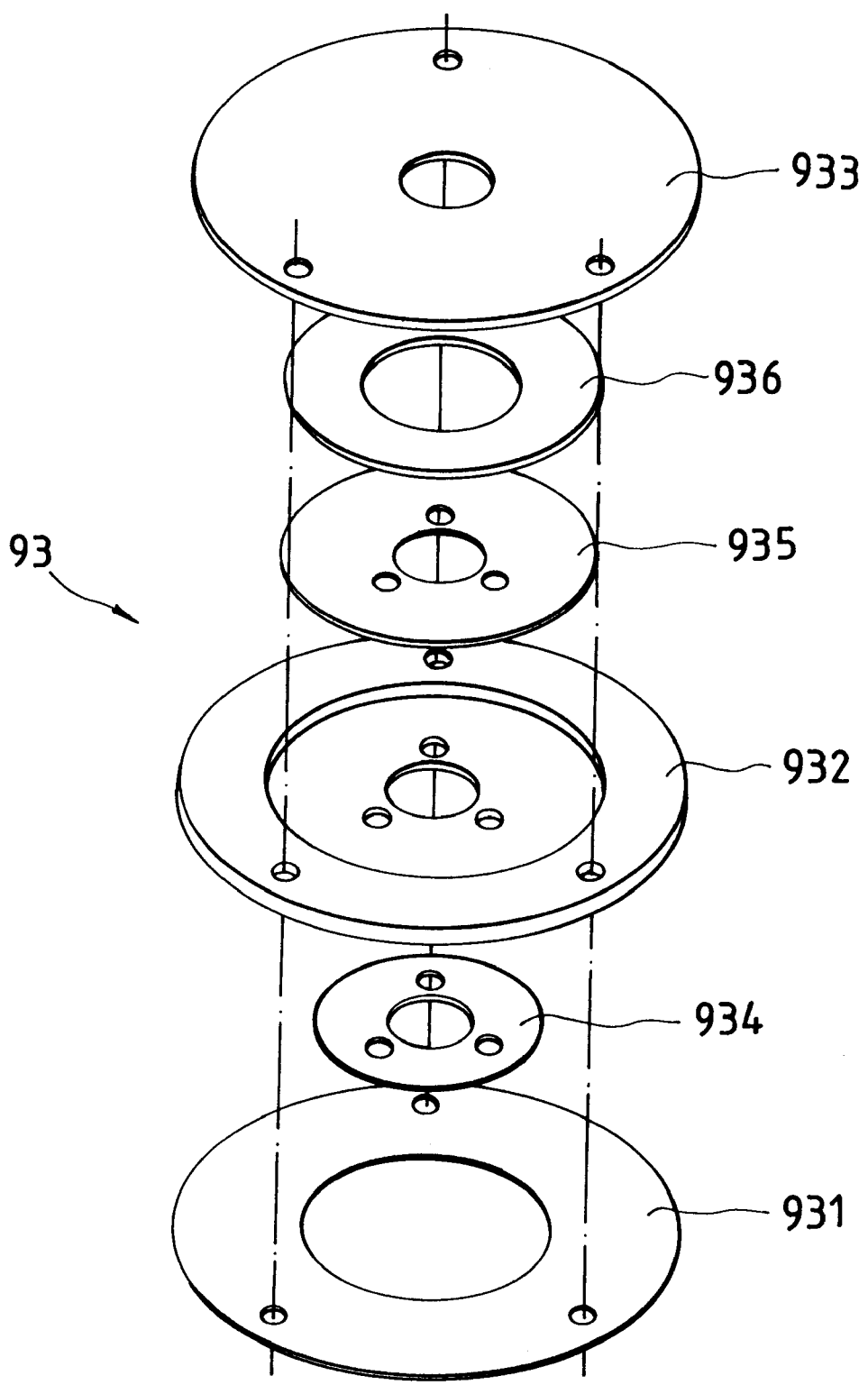
FIG. 8 is a perspective disassembled view of the heating device of the conventional electrical cup.

Referring to FIG. 6, it is a cross-sectional view of another embodiment of the present invention. In which, the bottom face of the pot 60 is disposed with a temperature-storing conducting element 61. The shape of the seat 70 is designed according the shape of the pot 60. Also, the seat 70 has an insulating member 72 for holding the temperature-storing acting body 71 and a resilient member 73. The insulating pad 74 is disposed on the seat 70. The insulating member 72 and the disk portion 50 are integrally formed. The plastic pad 75 is disposed on the surface of the pot 60 so that the heat or coldness will not be lost too quickly. Of course, the inner space of the insulating member 72 can be vacuumed or be filled with formed material for better insulating effect.

The usage of the pot 60 is similar to the usage of the above-mentioned cup 10. Before filling the drink into the pot 60 and put on the seat 70, the temperature-storing acting body 71 which is preheated to 150° C. is moved on the resilient member 73 inside the insulating member 72 of the seat 70. Then, put the pot 60 on the seat 70. The resilient member 73 will push the temperature-storing acting body 71 to closely contact with the temperature-storing conducting element 61 of the pot 60. It can keep the temperature of the pot on 80° C. to 60° C. about 20 to 30 minutes. After the pot 60 is taken out from the seat 70, the storing conducting element 61 of the pot 60 win keep the pot 60 hot for a while.

Thus, the present invention has the temperature-storing function. It has no electric wire connection problem. It is suitable for a hot or cold drink. And, once the cup/pot is taken out, the cup/pot still can remain hot/cold for a while. So, the utility of the present invention is excellent.

What is claimed is:

1. A temperature-storing cup/pot structure comprising:

a cup and a seat for holding said cup, said cup can be used independently, said seat being formed with a disk-shaped periphery;

wherein a temperature-storing conducting element is disposed on a bottom face of said cup, said temperature-storing conducting element contains a temperature-storing liquid, a replaceable temperature-storing acting body is disposed on said seat, and said temperature-storing acting body contains the temperature-storing liquid;

so that the hot or cold temperature-storing acting body can provide a hot or cold source to the temperature-storing conducting element on the bottom of the cup, and allowing a temperature of a drinking liquid inside the cup/pot's remaining unchanged for a period of time.

2. The temperature-storing cup/pot structure as claimed in claim 1, wherein said cup is replaced by a pot, said pot can be used independently, and said pot has the temperature-storing function.

3. The temperature-storing cup/pot structure as claimed in claim 1, wherein the bottom face of the cup is disposed with an insulation pad for insulating heat loss, so as to protect a user's hand while lifting the cup and prevent scratching on a table surface.

4. The temperature-storing cup/pot structure as claimed in claim 1, wherein an insulating member is disposed around the temperature-storing acting body on the bottom of the cup.

5. The temperature-storing cup/pot structure as claimed in claim 4, wherein an inner space of the insulating member is vacuumed.

6. The temperature-storing cup/pot structure as claimed in claim 4, wherein an inner space of the insulating member is filled with formed material.

7. The temperature-storing cup/pot structure as claimed in claim 1, wherein an resilient element is disposed inside the seat for pushing said temperature-storing acting body close contacting with the temperature-storing conducting element of the cup.

8. The temperature-storing cup/pot structure as claimed in claim 7, wherein said resilient element is a spring.

9. The temperature-storing cup/pot structure as claimed in claim 1, wherein a plastic pad is disposed between the seat and the cup/pot so as to reduce the heat transfer therebetween.

10. The temperature-storing cup/pot structure as claimed in claim 1, wherein said seat has a disk portion, a base portion and a ring portion for supporting and sealing said temperature-storing acting body.

11. The temperature-storing cup/pot structure as claimed in claim 1, wherein said cup is made of metal and coated with enamel.

* * * * *